No. 643,396. Patented Feb. 13, 1900.
R. M. BIRDSALL & C. L. KRUM.
APPARATUS FOR PURIFYING AND DRYING AIR.
(Application filed July 30, 1897.)
(No Model.) 2 Sheets—Sheet 1.

No. 643,396. Patented Feb. 13, 1900.
R. M. BIRDSALL & C. L. KRUM.
APPARATUS FOR PURIFYING AND DRYING AIR.
(Application filed July 30, 1897.)
(No Model.) 2 Sheets—Sheet 2.

United States Patent Office.

RICHARD M. BIRDSALL AND CHARLES L. KRUM, OF CHICAGO, ILLINOIS; SAID KRUM ASSIGNOR TO ROCKWELL KING, OF SAME PLACE.

APPARATUS FOR PURIFYING AND DRYING AIR.

SPECIFICATION forming part of Letters Patent No. 643,396, dated February 13, 1900.

Application filed July 30, 1897. Serial No. 646,474. (No model.)

*To all whom it may concern:*

Be it known that we, RICHARD M. BIRDSALL and CHARLES L. KRUM, residents of the city of Chicago, in the county of Cook and State of Illinois, have invented certain new and useful Improvements in Apparatus for Purifying and Drying Air, of which we do declare the following to be a full, clear, and exact description, reference being had to the accompanying drawings, forming a part of this specification.

In the cold storage of perishable commodities—such as eggs, fruit, or the like—it is important not only that the air should be maintained at a low temperature, but also that the air within the cold-storage rooms should be maintained in as pure a condition as possible. Inasmuch as it is not economically feasible to replace the foul or tainted air of the cold-storage room by fresh air from outside the building, it has become desirable to provide means whereby the air within the cold-storage room can be maintained in a pure condition.

The object of our present invention is to provide a simple and effective apparatus for purifying and drying the air within a cold-storage compartment, so that the necessity of admitting outside air for replacing the foul air of the room may be avoided; and this object we have accomplished by the features of invention hereinafter described, illustrated in the accompanying drawings, and particularly pointed out in the claims at the end of this specification.

Figure 1:
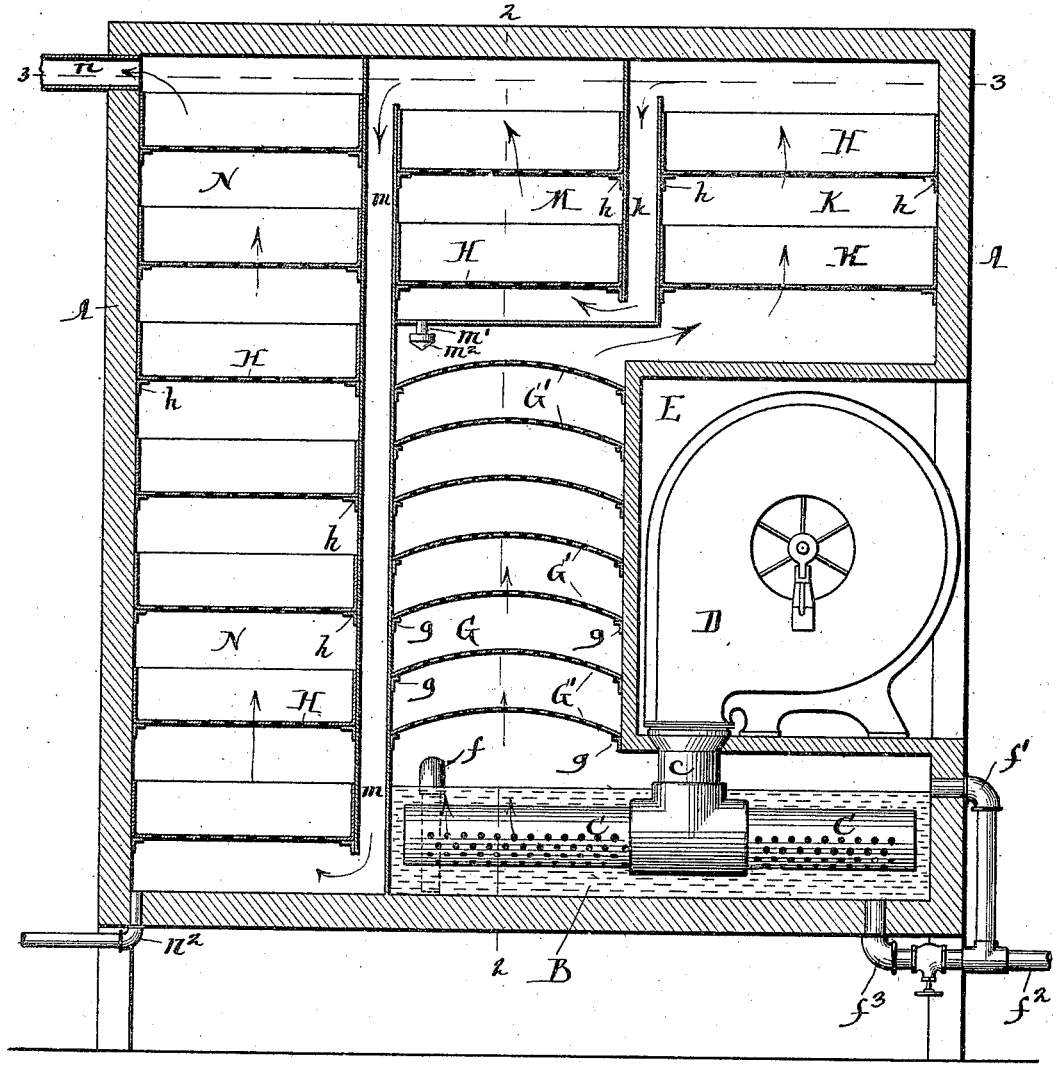
Figure 2:
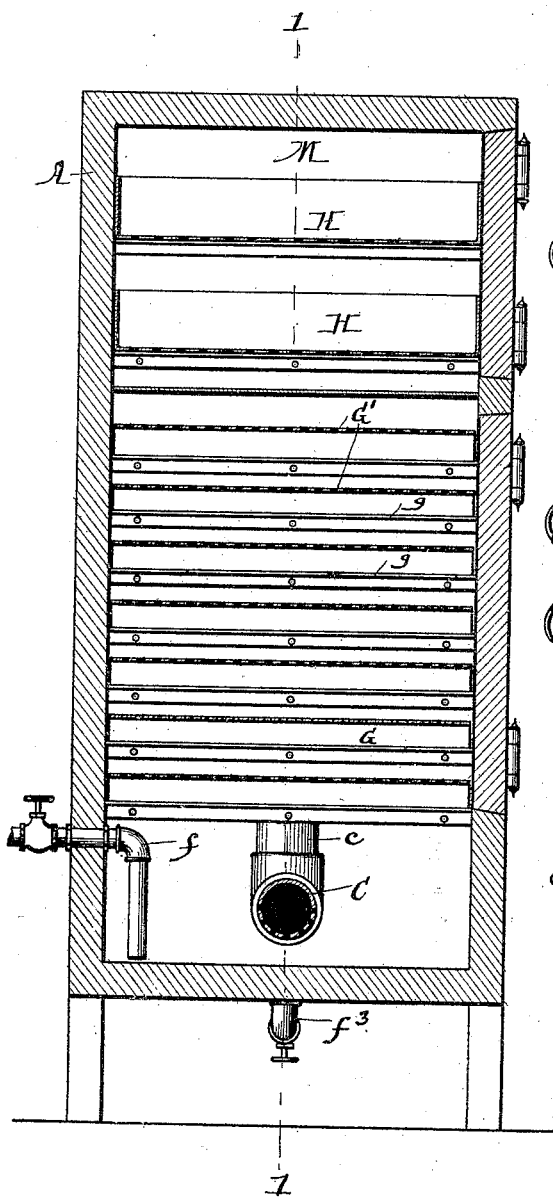
Figure 3:
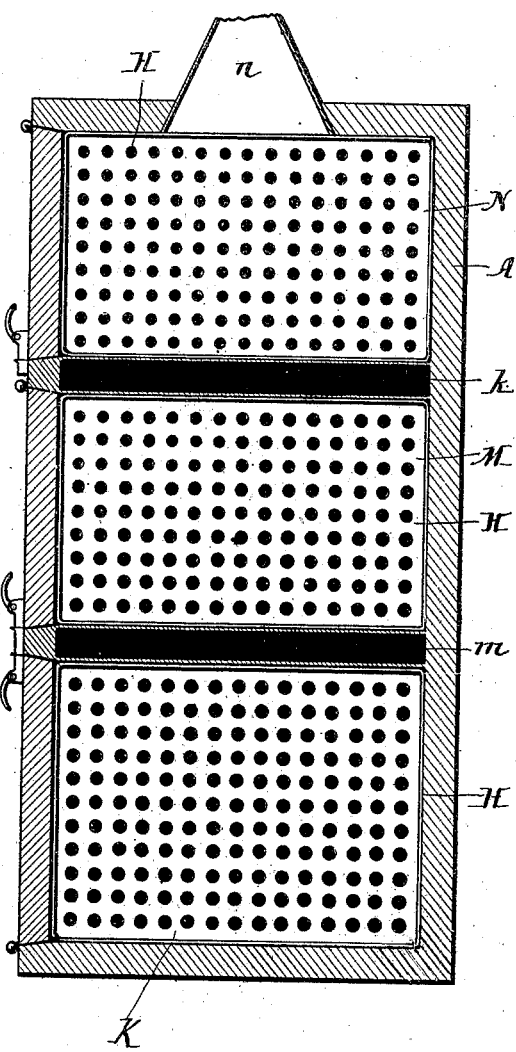

Figure 1 is a view in vertical longitudinal section on line 1 1 of Fig. 2. Fig. 2 is a view in vertical cross-section on line 2 2 of Fig. 1. Fig. 3 is a view in horizontal section on line 3 3 of Fig. 1.

In the preferred embodiment of our invention we employ a box-like structure A, that is divided into various compartments and channels, which by preference are arranged as shown in the accompanying drawings. In the lower part of the box or casing A is placed a tank B for containing water whereby the air will be washed. Within the tank B and extended from end to end thereof is the perforated pipe C, that connects by a short pipe $c$ with a suitable blower D, that is located within an open compartment E, formed at one end of the box or casing A. In order to maintain the supply of water within the tank B at a proper level, we employ a water-supply pipe $f$ and an overflow-pipe $f'$, that leads to a drain-pipe $f^2$, and, if desired, also a short branch $f^3$ of the drain-pipe may connect to the bottom of the tank B in order that the contents may be removed therefrom. Above the tank B is formed a compartment G for containing the condenser-plates $G'$, these condenser-plates consisting, preferably, of perforated sheet-metal plates, the edges of which rest upon brackets $g$, attached to the side walls of the compartment G. Preferably the condenser-plates $G'$ are curved or arched, as shown, in order to insure the return of water of condensation to the tank B. The upper end of the condenser-chamber G is connected with one or more compartments that hold trays or plates containing chlorid of lime or like deliquescent material, whereby the air will be dried after it has been washed. In the preferred form of the invention, which is that shown in the accompanying drawings, the trays H for chlorid of lime or the like will be held within the three compartments K, M, and N, the compartment K being open at its top and communicating by a channel $k$ with the bottom of the compartment M, while the top of this compartment M is open and communicates by channel $m$ with the bottom of the compartment N, which last-named compartment is furnished with a discharge pipe or aperture $n$, through which the purified and dried air will be discharged.

By reference more particularly to Figs. 2 and 3 of the drawings it will be seen that the front of each of the compartments is provided with a suitable door, whereby access is had to the compartment for the purpose of removing the trays in order to replenish the supply of chlorid of lime or the like that from time to time may be necessary. The bottom of the compartment M is shown as provided with a drip-pipe $m'$, having a trap-cup $m^2$ at its lower end, so that the water and lime dripping from the compartment M may pass down into the chamber or compartment G, whence it will fall into the tank B. At the bottom of the compartment N is also placed a drain-pipe $n^2$, through which the water and lime may drain from such compartment.

From the foregoing description and by reference to the arrows in Fig. 1 of the drawings the operation of our improved apparatus will be seen to be as follows, viz: Air will be delivered by the blower D through the perforated pipe C beneath the water within the tank B, and will thus be washed. As the air rises from the top of the tank B it will pass up through the condenser-plates G', and a large part of the moisture carried by the air will condense upon the surface of these plates and drip back into the tank B. After leaving the condenser-plates G' the air will pass to the bottom of the compartment K, thence up through the trays H, containing chlorid of lime or the like, thence down through the channel $k$ to the bottom of the compartment M, thence up through the trays within the compartment M, thence into the top of the channel $m$ and down this channel to the bottom of the compartment N, thence up through the trays H within this compartment, and, finally, out through the discharge-pipe $n$ at the top of the compartment N. It will thus be seen that the air taken from the interior of a storage-room will be first washed in the tank B and then partially dried by the condensation of its moisture by the plates G', and, finally, dried by the chlorid of lime within the trays H, so that as the air is discharged again into the storage-room it will be in pure and dry condition. We prefer to employ the condenser-plates G' because these plates serve, by the condensation of a large part of the moisture carried by the air, to save the lime within trays H, thus not only effecting a material economy in the amount of lime employed, but avoiding the necessity of frequently replenishing the trays. The trays H are shown as supported by angle-irons or brackets $h$, attached to the side walls of their respective compartments, the trays being endwise removable from the compartments; but it is obvious that any convenient means may be employed for holding the chlorid of lime within the compartments in such manner that the air may be freely forced therethrough.

While we have illustrated what we prefer as the embodiment of our invention, we do not wish the invention to be understood as restricted to the precise details of structure or arrangement hereinbefore set forth.

Having thus described our invention, what we claim as new, and desire to secure by Letters Patent, is—

1. An apparatus for washing, drying and purifying air, comprising an inclosing casing having therein a tank for containing water whereby the air will be washed, a submerged pipe for delivering air beneath the surface of the water within said tank, a drying-chamber containing trays of chlorid of lime through which the washed air will be passed, said chamber being in communication with the water-tank and a condenser-chamber provided with condenser-plates and arranged intermediate the water-tank and the chlorid-of-lime chamber, said condenser-plates serving to remove a large part of the moisture from the air after it leaves the water-tank and before it passes through the chlorid-of-lime trays whereby the wasteful deliquescence of the chlorid of lime is checked.

2. An apparatus of the character described comprising a tank B for containing water and provided with a perforated air-delivery pipe, a condensing-chamber G arranged above said tank B and provided with a series of condenser-plates G', a compartment K connected with the upper end of said condensing-chamber G and containing trays, and tray-compartments M and N, the bottom of the compartment M being connected to the top of the compartment K, and the bottom of the compartment N being connected by a suitable channel with the top of the compartment M whereby the supply of air after leaving the tank B may be forced up through the condensing-chamber and thence through the several compartments containing chlorid-of-lime trays, substantially as described.

RICHARD M. BIRDSALL.
CHARLES L. KRUM.

Witnesses:
OLIVER C. DENNIS,
ALBERTA ADAMICK.